United States Patent [19]
Obländer et al.

[11] Patent Number: 5,205,120
[45] Date of Patent: Apr. 27, 1993

[54] MIXTURE-COMPRESSING INTERNAL-COMBUSTION ENGINE WITH SECONDARY-AIR INJECTION AND WITH AIR-MASS METERING IN THE SUCTION PIPE

[75] Inventors: Kurt Obländer, Kernen; Ludwig Fricker; Alexander Anderson, both of Stuttgart; Hans-Karl Weining, Esslingen; Selcuk Geldec, Talheim; Ralf Krukenberg, Aichwald; Gerhard Fingerle, Köngen, all of Fed. Rep. of Germany

[73] Assignee: Mercedes-Benz AG, Fed. Rep. of Germany

[21] Appl. No.: 811,669

[22] Filed: Dec. 23, 1991

[30] Foreign Application Priority Data

Dec. 22, 1990 [DE] Fed. Rep. of Germany ....... 4041628

[51] Int. Cl.⁵ .............................................. F01N 3/22
[52] U.S. Cl. .......................................... 60/284; 60/307; 123/531; 123/559.1; 123/585
[58] Field of Search ................ 60/285, 284, 307; 123/559.1, 531, 585

[56] References Cited

U.S. PATENT DOCUMENTS

| | | | |
|---|---|---|---|
| 4,206,599 | 6/1980 | Sumiyoshi | 60/285 |
| 4,351,304 | 9/1982 | Schweizer | 123/585 |
| 4,387,695 | 6/1983 | Höppel | 123/531 |
| 4,557,241 | 12/1985 | Kawachi | 123/559.1 |

FOREIGN PATENT DOCUMENTS

3433465  5/1985  Fed. Rep. of Germany.

*Primary Examiner*—Douglas Hart
*Attorney, Agent, or Firm*—Evenson, McKeown, Edwards & Lenahan

[57] ABSTRACT

The invention relates to a mixture-compressing internal-combustion engine with secondary-air injection and with air-mass measurement as well as with an injection valve sequential fuel injection and air assistance, the air line provided for air assistance being equipped with a shut-off valve opening in the starting and the warmup phase of the internal-combustion engine.

2 Claims, 4 Drawing Sheets

MIXTURE-COMPRESSING INTERNAL-COMBUSTION ENGINE WITH SECONDARY-AIR INJECTION AND WITH AIR-MASS METERING IN THE SUCTION PIPE

BACKGROUND AND SUMMARY OF THE INVENTION

The invention relates to a mixture-compressing internal-combustion engine with secondary-air injection and with air-mass metering in the suction pipe.

Internal-combustion engines of this type, such as are already known in the applicant's "Mercedes" series vehicles, are equipped with secondary-air lines, by which air sucked in by a secondary-air pump and filtered when the internal-combustion engine is in the running-up phase in conveyed to the exhaust-gas side via a controlled secondary-air cut-off valve. This ensures an accelerated response behavior of the catalysts.

Furthermore, the internal-combustion engine has a sequential fuel injection which supplies each cylinder with the correct quantity of fuel at the optimum time.

An object on which the invention is based is, in an internal-combustion engine of the relevant generic type, to provide measures by which further improvements as regards the mixture preparation and the reduction of harmful exhaust-gas constituents can be obtained in the starting and the running-up phase.

According to the invention, this object is achieved by an arrangement comprising:

a suction pipe provided with a throttle flap and an air-mass meter and opening to an engine cylinder inlet valve, a secondary-air line leading to a exhaust line in by-passing relationship to the suction pipe, a secondary-air cut-off valve in the secondary-air line, secondary-air cut-off valve control apparatus for opening the secondary-air cut-off valve during an engine running-up phase, an injection valve for sequential fuel injection into the suction pipe, an additional air line leading to the injection valve for selectively providing air assistance to fuel injection, an air shut-off valve in the additional air line, and air shut-off valve control apparatus for opening the air shut-off engine valve at least during engine starting and an engine running up phase.

By the use of an air-assisted injection valve with a controlled air supply, the air being taken from the existing secondary-air injection both in the starting phase and in the running-up phase, the air mass hitherto insufficient in these phases can be matched to the air requirement of the air-assisted injection valve necessary for an optimum mixture preparation.

Although an internal-combustion engine with an air-assisted injection valve is known from U.S. Pat. No. 4,557,241, nevertheless in this arrangement the air assistance takes place in a relatively uncontrolled manner.

Other objects, advantages and novel features of the present invention will become apparent from the following detailed description of the invention when considered in conjunction with the accompanying drawings.

DETAILED DESCRIPTION OF THE DRAWINGS

Figure 1:
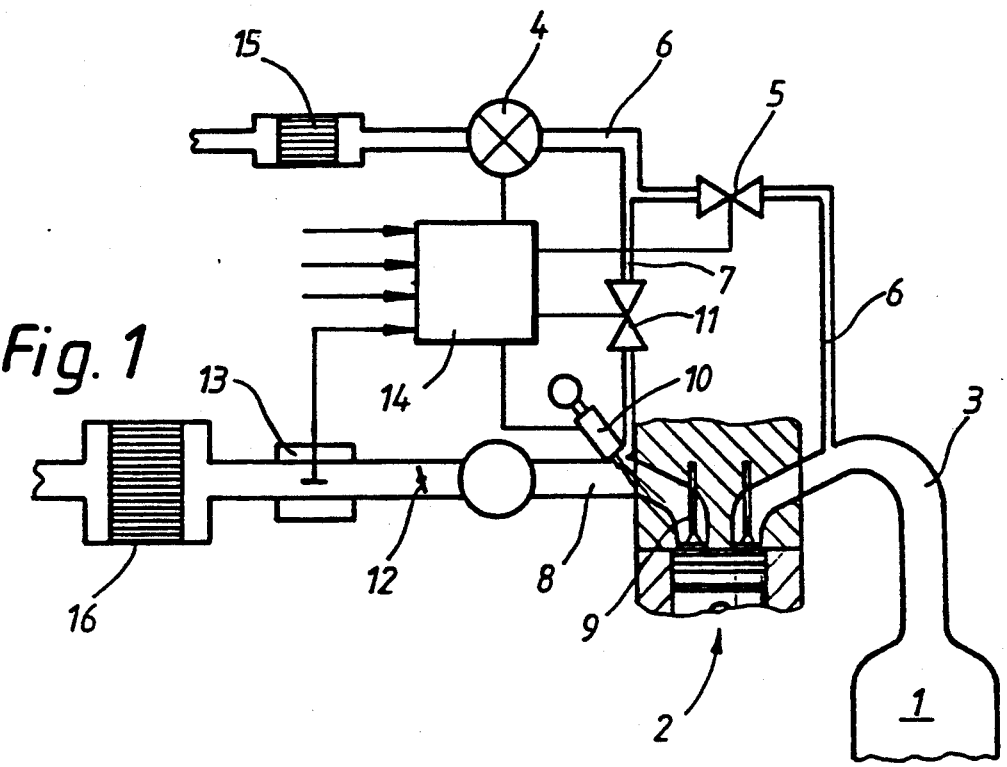
FIG. 1 is a schematic view of an internal-combustion engine with a line system on the intake side and exhaust-gas side, a secondary-air pump sucking air directly from the atmosphere for the secondary-air injection, and with an air line leading to the injection valve and branching off from the secondary-air line, constructed according to a first preferred embodiment of the invention.

A mixture-compressing internal-combustion engine 2 equipped with a catalyst 1 and having secondary-air injection, air-mass metering and sequential fuel injection is provided with a secondary-air line 6 which leads to an exhaust-gas pipe 3 and possesses a secondary-air pump 4 and a secondary-air cut-off valve 5 and from which branches off between the pump and valve an air line 7 connected to an injection valve 10 fastened in the suction pipe 8 near an inlet control valve 9. A air shut-off valve 11 is provided in the air line 7. Arranged in the suction pipe 8 upstream of a throttle flap 12 is an air-mass meter 13, of which the signals and further signals dependent on operating parameters, such as engine speed, load, temperature, are entered in an electronic control unit 14 which, after signal processing, accordingly activates the injection valve 10, the secondary-air cut-off valve 5 and the air shut-off valve 11.

Figure 2:
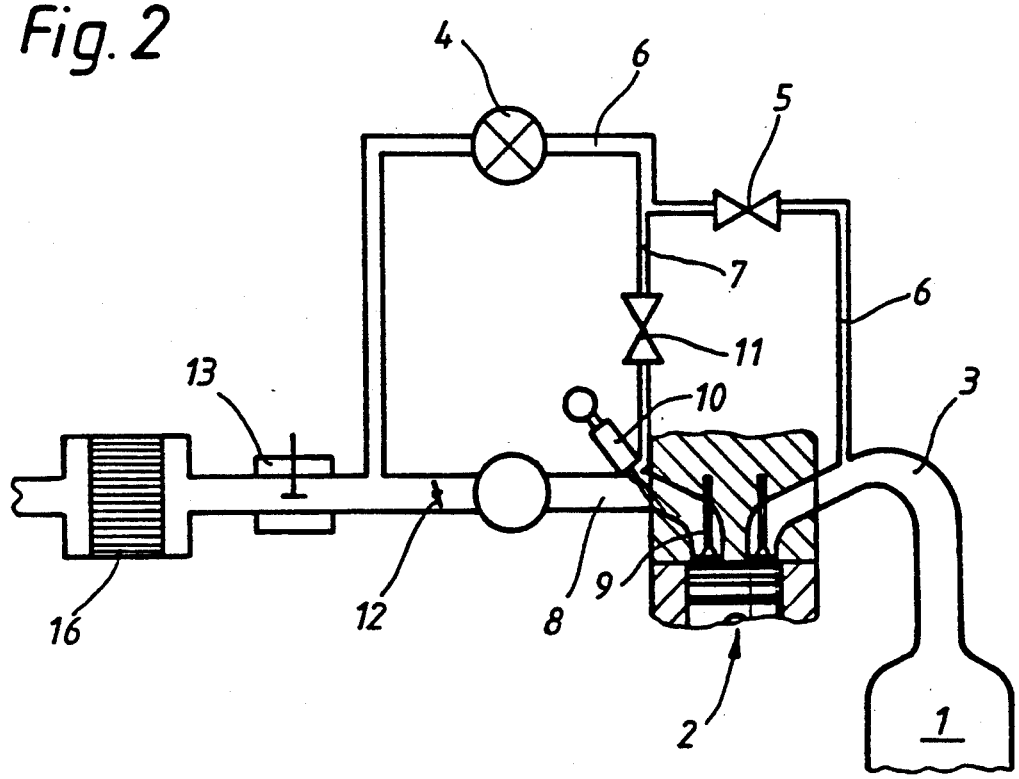
FIG. 2 is a view similar to FIG. 1, showing a modified embodiment with air intake for the secondary-air from the suction pipe.

According to FIG. 1, the air intake takes place directly from the atmosphere via a filter 15 in the secondary-air line 6, whereas according to FIG. 2 the air is taken from the suction pipe 8. The secondary-air line 6 leads away from a suction pipe portion 8a located between the air-mass meter 13 and the throttle flap 12. 16 denotes an air filter in the suction pipe 8 upstream of the air-mass meter 13.

The operating mode of the two versions according to FIGS. 1 and 2 is as follows:

In the starting phase, the secondary-air pump 4 is put into operation, the secondary-air cut-off valve 5 is closed and therefore initially does not allow any secondary-air injection, the air shut-off valve 11 is opened and the injection valve 10 is air-assisted as early as from this moment. After approximately 3 to 5 seconds with the commencement of the running-up phase, in the non-stationary mode, the secondary-air cut-off valve 5 opens and the air shut-off valve 11 continues to remain open. The cut-off of the secondary-air cut-off valve takes place as a function of the engine speed, load and temperature. The air assistance can likewise be canceled after the running-up phase. The rating of the air assistance and air injection in terms of the air requirement, super critical pressure difference and sound velocity in the narrowest gap allows a computational or characteristic-dependent correction of the injection time. The correction deviation related to the actual air requirement of the internal-combustion engine remains only slight.

Figure 3:
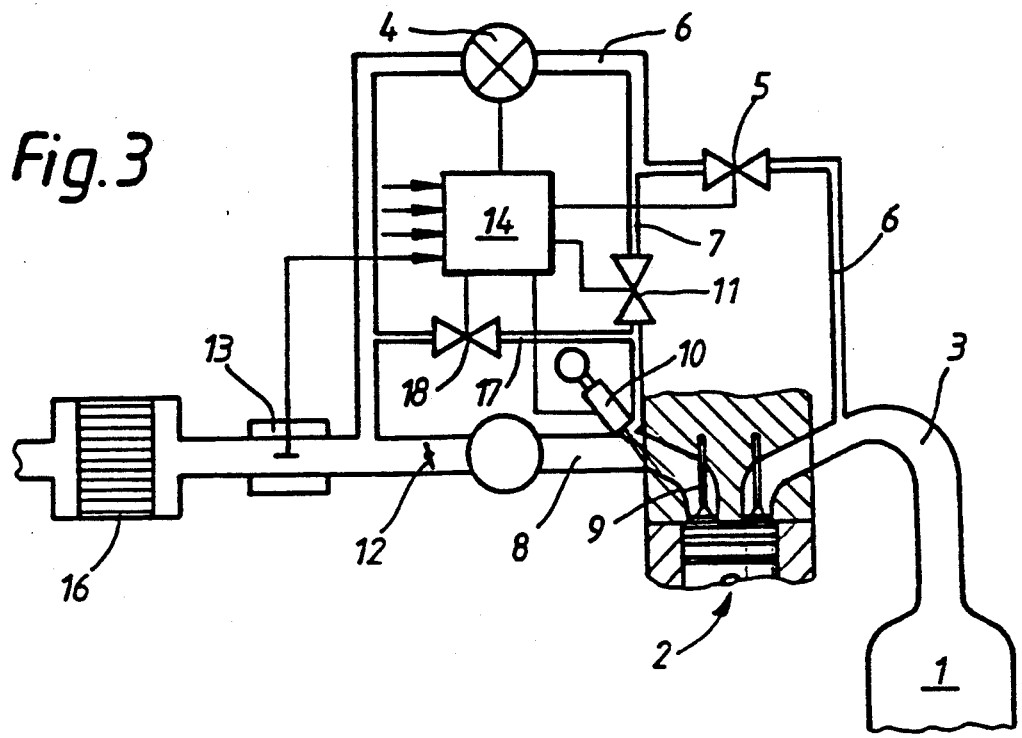
FIG. 3 is a view similar to FIG. 1, showing a further modified embodiment with a short-circuit line bypassing the secondary-air pump and having an air shut-off valve.

The exemplary embodiment according to FIG. 3 differs from that according to FIG. 2 in the additional short-circuit line 17 which contains a short-circuit shut-off valve 18. The short-circuit line 17 bypasses the secondary-air pump 4 and opens into the air line 7 between the air shut-off valve 11 and injection valve 10.

The functioning of this exemplary embodiment largely corresponds to the functioning described previously, but furthermore the short-circuit line 17 provided is ineffective in the starting and in the running-up phase. Only after the secondary-air cut-off valve 5 and air shut-off valve 11 have closed at the end of the running-up phase does the short-circuit shut-off valve 18 open and also remains open in the non-stationary mode. The bypass air is regulated automatically according to the throttle-flap position, that is to say, with an increasing load, the pressure difference at the injection valve changes so that under full load there is no air assistance.

Figure 4:
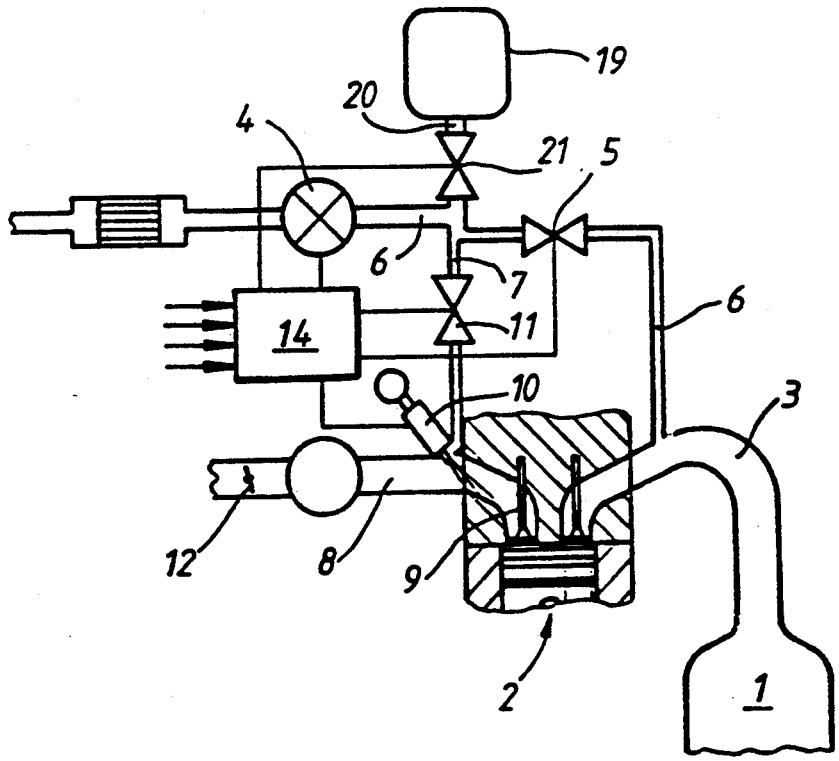
FIG. 4 is a view similar to FIG. 1, but showing a further modified embodiment with the arrangement of an air cell in the line system.

The version shown in FIG. 4 is identical to that according to FIG. 2, with the exception of the arrangement of an air cell 19, of which the line 20 with an interposed control valve 21 branches off from the secondary-air pump 5 arranged in the secondary-air line 6 between the secondary-air pump 4 and secondary-air cut-off valve 5.

The functioning is the same a that according to FIG. 2, the control valve 21 being closed for approximately 3 seconds in the starting phase and, after starting, opening in the running-up phase until a specific accumulator pressure in the air cell 19 is reached and the line 20 closes again. But as soon as an acceleration enrichment BA, namely an increased load change per unit time, is detected in the running-up phase, the air cell takes effect as a result of the brief opening of the control valve 21, in order to compensate the insufficient air quantity at the injection valve 10 during the BA.

Figure 5:
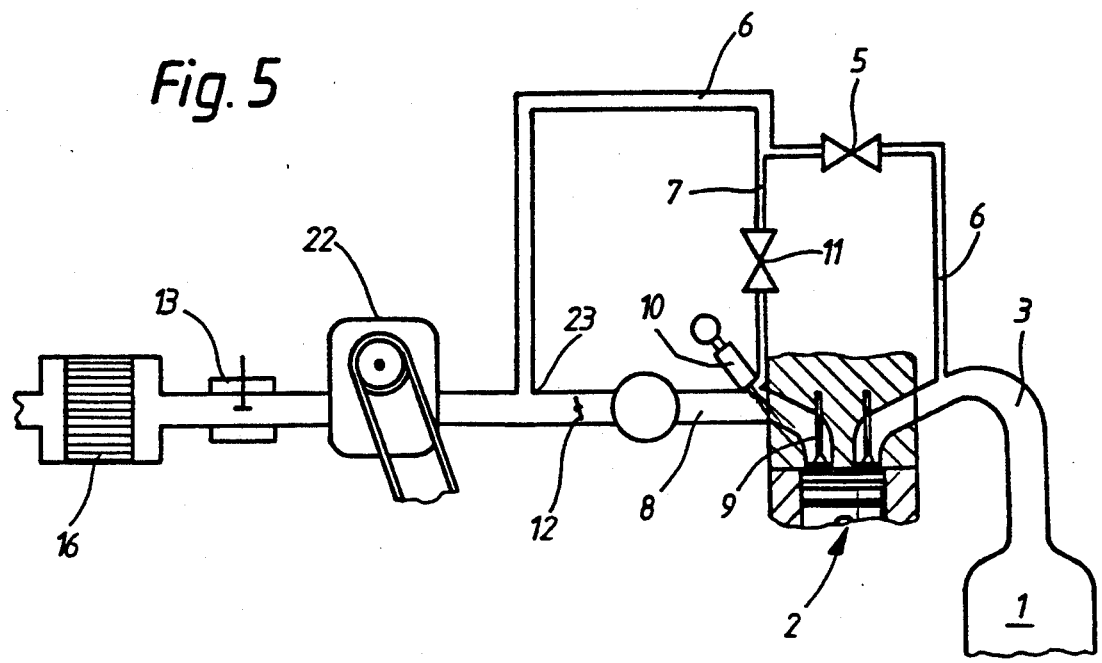
FIG. 5 is a view similar to FIG. 1, showing a further modified embodiment with the arrangement of a super-charger instead of a secondary-air pump.

FIG. 5 illustrates a version which corresponds to the version according to FIG. 2, but here the secondary-air line 6 is replaced by a supercharger 22 which is inserted in the suction pipe 8 between the air-mass meter 13 and the branch point 23 for the secondary-air injection.

Figure 6:
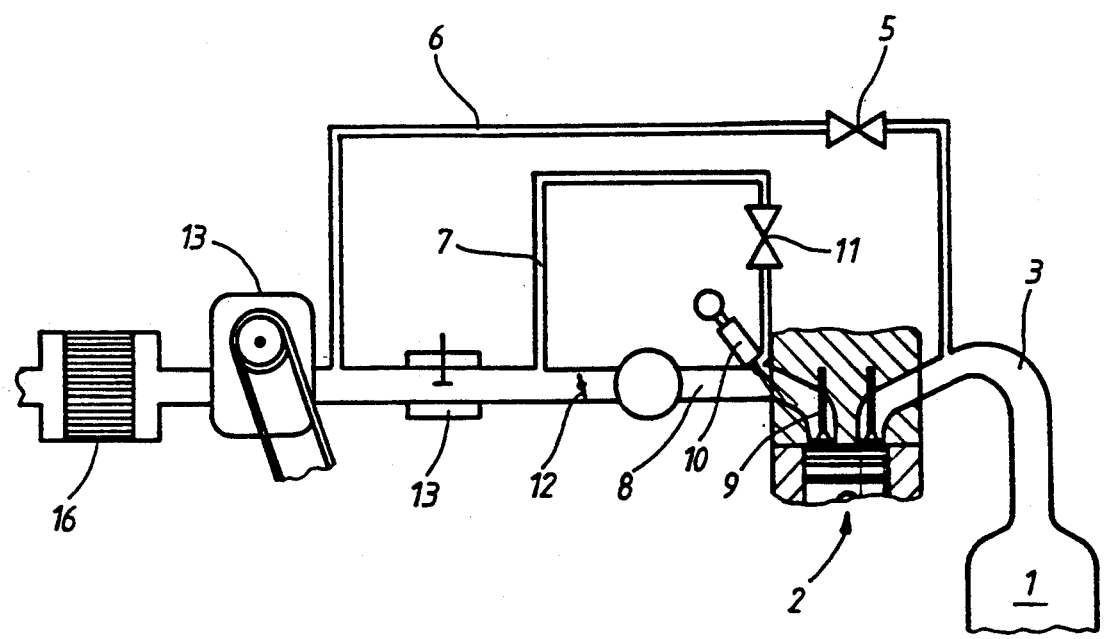
FIG. 6 is a view similar to FIG. 1, showing a further modified embodiment with a secondary-air line and an air line lying separately from one another and with a super-charger.

In the version according to FIG. 6, the air line 7 is arranged separately from the secondary-air line 6. The branch-off of the air line 7 is located between the air-mass meter 13 and throttle flap 12, whilst the branch-off of the secondary-air line 6 is between the supercharger 22 and air-mass meter 13.

Figure 8:
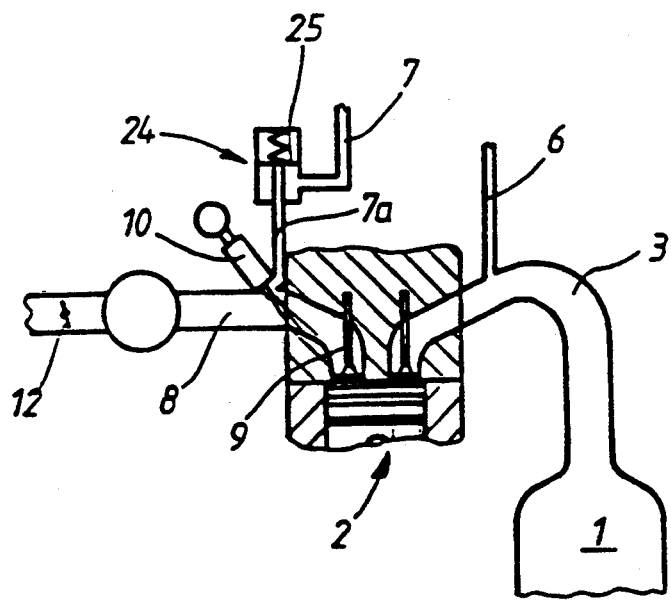
FIG. 8 shows another modified embodiment of a line system with a snifter valve upstream of the injection valve.

In FIG. 8, the air line 7 is equipped upstream of the injection valve 10 with a snifter valve 24 which, as a result of the pressure pulsation generated, makes it possible to obtain a better preparation and a reduction of the air mass flow, whilst at the same time ensuring the same effect on the fuel jet.

Figure 7:
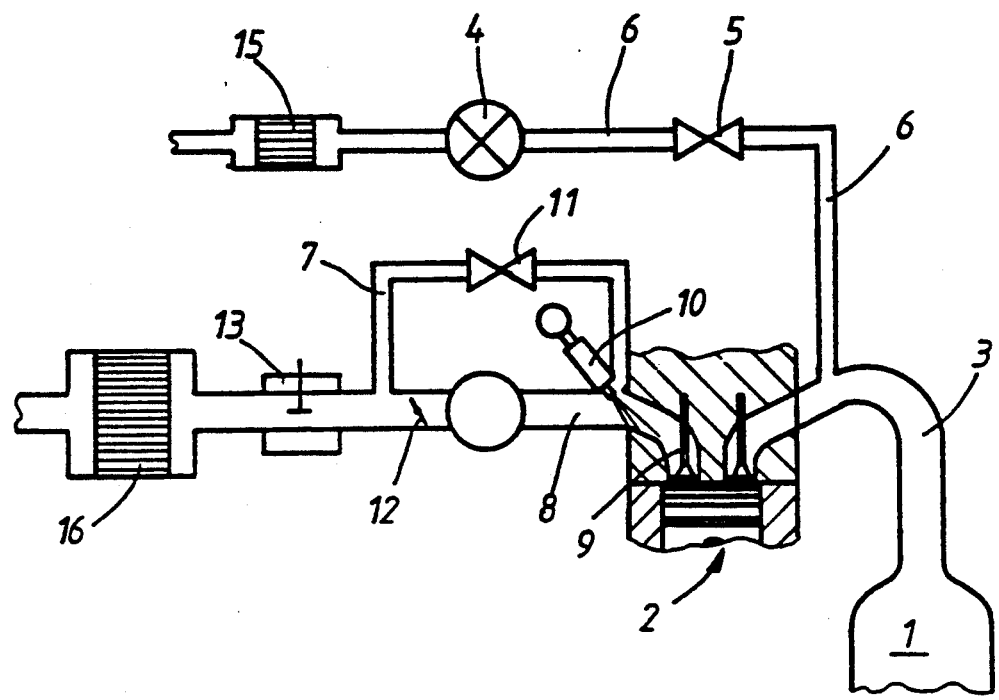
FIG. 7 shows a line system like that of FIG. 1, but with an air line branching off from the suction pipe, in accordance with yet another modified embodiment.

FIG. 7 shows a simplified version which differs from that according to FIG. 1 in that the air line 7 containing the air shut-off valve 11 branches off not from the secondary-air line 6, but from the suction pipe 8 upstream of the throttle flap 12. A correction of the fuel/air ratio for the internal-combustion engine is unnecessary here, because the air for air assistance is branched off downstream of the air-mass metering.

The snifter valve 24 can be used in all the exemplary embodiments, with the exception of the version according to FIG. 3 having a short-circuit line 17, since the secondary-air pump 4 or supercharger 22 generates a pressure difference at the snifter valve 24, so that a diaphragm 25 acting counter to spring force opens the air-line portion 7a leading to the injection valve 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Mixture-compressing internal-combustion engine comprising:
   a suction pipe provided with a throttle flap and an air-mass meter and opening to an engine cylinder inlet valve,
   a secondary air line leading to an exhaust line in by-passing relationship to the suction pipe,
   a secondary-air cut-off valve in the secondary air line,
   secondary-air cut-off valve control apparatus for opening the secondary-air cut-off valve during an engine warming-up phase,
   an injection valve for sequential fuel injection into the suction pipe,
   a supercharger to provide a supercharged internal combustion engine; and
   wherein the secondary-air line leading to the exhaust line via the secondary-air cut-off valve branches-off from the suction pipe between the supercharger and the air mass meter
   wherein, downstream of the air mass meter, an additional air line connected with the injection valve branches-off from the suction pipe.

2. Mixture-compressing internal-combustion engine comprising:
   a suction pipe provided with a throttle flap and an air-mass meter and opening to an engine cylinder inlet valve,
   a secondary air line leading to an exhaust line in by-passing relationship to the suction pipe,
   a secondary-air cut-off valve in the secondary air line,
   secondary-air cut-off valve control apparatus for opening the secondary-air cut-off valve during an engine warming-up phase,
   an injection valve for sequential fuel injection into the suction pipe,
   a supercharger located downstream of the air mass meter to provide a supercharged internal combustion engine,
   wherein the secondary air-line is equipped with the secondary-air cut-off valve and branches-off from the suction pipe between the superflanges and the throttle flap.

* * * * *